United States Patent [19]

Roddy et al.

[11] Patent Number: 5,026,133
[45] Date of Patent: Jun. 25, 1991

[54] LARGE FORMAT LASER SCANNER WITH WAVELENGTH INSENSITIVE SCANNING MECHANISM

[75] Inventors: James E. Roddy; Badhri Narayan; Richard A. Stark, all of Rochester; Laurie L. Voci, Farmington, all of N.Y.

[73] Assignee: Torii Winding Machine Co., Ltd., Kyoto, Japan

[21] Appl. No.: 517,133

[22] Filed: May 1, 1990

[51] Int. Cl.$^5$ .............................................. G02B 26/10
[52] U.S. Cl. ...................................... 350/6.4; 350/6.3; 350/6.7; 358/491; 250/236
[58] Field of Search ................... 350/6.2, 6.3, 6.4, 6.7, 350/6.8, 6.9; 250/236, 578.1; 358/491, 493

[56] References Cited

U.S. PATENT DOCUMENTS

| | | |
|---|---|---|
| 3,614,193 | 10/1971 | Beiser . |
| 3,651,256 | 3/1972 | Sherman et al. ................... 250/236 |
| 3,958,250 | 5/1976 | Rolon . |
| 4,206,482 | 6/1980 | DeLavalette et al. ............. 358/491 |
| 4,260,998 | 4/1981 | Fukui ................................. 358/491 |
| 4,289,371 | 9/1981 | Kramer ............................... 350/3.71 |
| 4,404,571 | 9/1983 | Kitamura . |
| 4,468,707 | 8/1984 | Kuehnle et al. ................... 358/491 |
| 4,525,749 | 6/1985 | Maeda et al. ...................... 358/493 |
| 4,595,957 | 6/1986 | Holthusen ......................... 358/491 |
| 4,606,601 | 8/1986 | Starkweather .................... 350/6.4 |
| 4,852,956 | 8/1989 | Kramer .............................. 350/3.71 |

FOREIGN PATENT DOCUMENTS 59-101068 6/1984 Japan .

Primary Examiner—Paul M. Dzierzynski
Assistant Examiner—Loha Ben
Attorney, Agent, or Firm—Armstrong, Nikaido, Marmelstein, Kubovcik & Murray

[57] ABSTRACT

A large format laser scanning system is disclosed that incorporates a compact, wobble free and wavelength insensitive scanning mechanism. The scanning mechanism includes a pentaprism and lens mounted on a rotating frame assembly that is located within a scanning drum. Multiple light beams generated by a light source are passed through the rotating pentaprism and lens to scan a photosensitive medium located on the interior surface of the scanning drum.

6 Claims, 2 Drawing Sheets

LARGE FORMAT LASER SCANNER WITH WAVELENGTH INSENSITIVE SCANNING MECHANISM

FIELD OF THE INVENTION

The present invention relates to laser scanning systems which scan one or more laser beams across a target surface in order to reproduce various images. In particular, the present invention relates to a large format laser scanning system in which a wobble free and wavelength insensitive scanning mechanism of compact and inexpensive design is rotated within a writing drum to increase scanning speed.

BACKGROUND OF THE INVENTION

There is a need within the graphic arts industry to print large format halftone images, generally in the range of 20×24 inches or greater, at extremely high resolutions at reasonable scanning speeds. Drums scanners that have been used in the past for printing large format images tend to require several minutes to produce an image. For example, a drum scanner available from Rudolf Hell Gmbh, model Hell DC 300, uses an argon laser split into six beams to simultaneously write on the external surface of a printing drum. Each of the six beams is independently modulated with an acousto-optic modulator which typically limits the bandwidth of each writing channel to a few megapixels per second. The drum scanner uses a water-cooled argon laser with an external modulator and associated optics which also makes the system very bulky. The scanner takes seven minutes to print a 20×24 inch image.

Hologon scanning systems have been proposed that overcome some of the disadvantages of the previously described scanner. The hologon scanning systems typically utilize a laser diode to generate a laser writing beam. The laser diode is either internally modulated or external modulation is provided by an acousto-optic or electro-optic modulator device. The write beam generated by the laser diode is deflected to scan across a target by a grating disc that is rotated by a motor. A laser diode is much more efficient and less bulky than the water-cooled argon laser employed in the Hell DC 300 scanner. In addition, modulation of the laser diode can be accomplished at pixel rates of gigapixels/second. Thus, the system throughput can also be increased.

While hologon scanning systems provide advantages over the drum scanner described above, they also have inherent disadvantages. It is difficult to increase system throughput by providing multiple write beams from multiple laser sources in hologon scanners, for example by the use of a laser diode array, because hologons are very sensitive to variations in the wavelength of the multiple write beams. The grating employed in hologon scanners is matched to a specific wavelength. Minor variations in wavelength between the beams, for example fractions of a nanometer, results in deflection errors and a degradation in the reproduced image. It is extremely difficult, however, to produce and maintain an array of laser diodes to have precisely matched wavelength characteristics in order to avoid this problem. In addition, early hologon scanners having a grating disc mounted on a motor shaft were susceptible to "wobble", i.e. the movement of the grating disc caused by bearing inaccuracies or other mechanical factors, which induces error in the deflected light beams. The grating discs are also susceptible to the formation of tiny cracks around their mounting point to the motor shaft due to vibrations when rotated at high speeds.

Efforts have been made to produce hologon scanning systems that are not susceptible to disadvantages set forth above. For example, Japanese Kokai No. 59-101068 proposes to eliminate the problems associated with the mounting of the grating disc on the motor drive shaft by making the disc part of the rotor of the motor. Correction for wobble by making the angle of incidence equal the diffraction angle is discussed in U.S. Pat. No. 4,289,371 issued to Kramer. However, while improvements have been made to correct for wobble and the cracking of the grating discs, the hologon scanning systems are still susceptible to error induced by laser sources mismatched in wavelength. Thus, it would be desirable to provide a laser scanning system of compact design that is wobble free and insensitive to minor variations in wavelength between multiple light sources.

SUMMARY OF THE INVENTION

The invention is directed to providing a large format laser scanning system that is compact, wobble free, and insensitive to variations in the output characteristics, and in particular wavelength variations of multiple light beams. More specifically, the invention provides a laser scanner that includes a scanning drum, a light source for generating multiple independently modulated light beams, a wobble free and wavelength insensitive scanning assembly located within the scanning drum, a mechanism for supplying the multiple light beams generated by the light source to the scanning assembly, a structure, coupled to the scanning assembly, for rotating the scanning assembly within the scanning drum about an axis; and a drive unit for driving the frame assembly along the axis. In a preferred embodiment, the wobble free and wavelength insensitive scanning assembly includes a pentaprism and lens mounted on a frame assembly.

BRIEF DESCRIPTION OF THE DRAWINGS

With the above as background, reference should now be made to the following detailed description of the preferred embodiment with reference to the accompanying drawings in which.

DETAILED DESCRIPTION OF PREFERRED EMBODIMENTS

The present invention is based, in part, on the recognition that a rotating prism scanner is relatively insensitive to wobble and variations in the output characteristics (wavelength in particular) of multiple light sources. While the general use of a prism in scanning systems is known, the invention incorporates the principles of a prism type scanning mechanism within a compact structure that is inexpensive and easy to manufacture.

Figure 1:
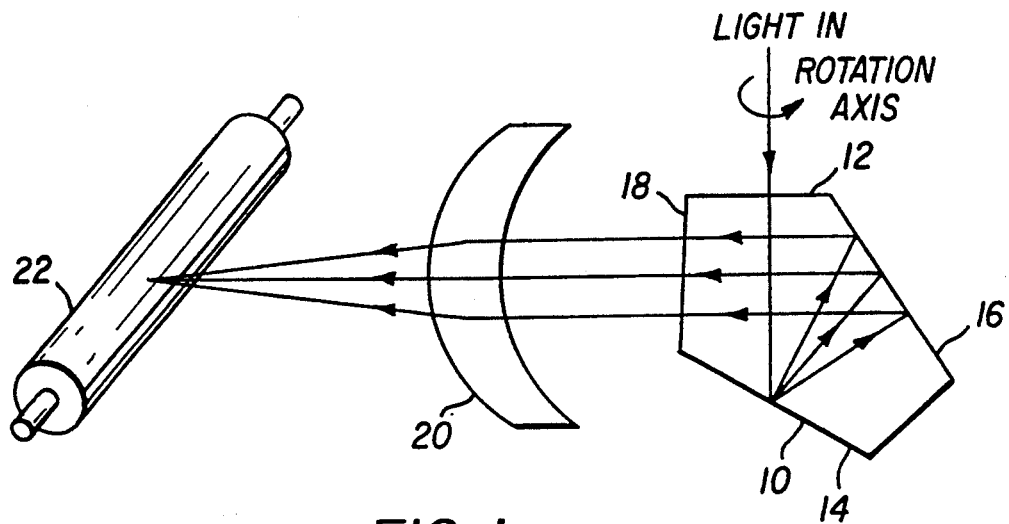
FIG. 1 illustrates a prior art scanning system that employs a pentaprism.

U.S. Pat. No. 4,606,601 issued to Starkweather (the contents of which are hereby incorporated by reference), for example, discloses a single facet wobble free light scanner that employs a prism as a scanning mechanism. illustrated in FIG. 1, an internally reflecting pentaprism 10 is rotated about an axis by a motor (not shown). A light beam impinges on an upper surface 12 of the pentaprism 10 and is reflected off a mirrored surface 14, with the angle of incidence equalling the angle of reflectance. The light beam is then reflected off of mirrored surface 16 and passes out of surface 18 of the pentaprism 10. The light beam is focused by a lens 20 on the external surface of a scanning drum 22.

Figure 2:
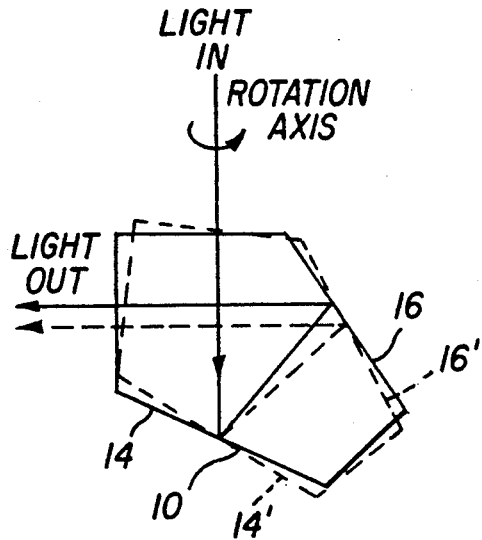
FIG. 2 illustrates the reflection of light through the pentaprism employed in the system of FIG. 1 in both normal and wobble positions.

FIG. 2 illustrates why the pentaprism 10 is insensitive to wobble. Wobble of the pentaprism 10 is indicated by the "dotted" lines. The position of each of the surfaces of the pentaprism 10 as wobble occurs is indicated by a prime (') notation. When wobble occurs, the input light reflects off of surface 14' and 16' before exiting the pentaprism 10. The angle of incidence and angle of reflectance of the light beam remains the same. Thus, the output light beam exits the pentaprism 10, when wobble occurs, in a plane parallel to that of the output light beams in the normal "non-wobble" position. In contrast to hologon disc scanners, the light is not reflected off at an angle not parallel to the optic axis. Instead, the light is reflected at the same angle, but slightly displaced in a parallel plane.

While the use of a pentaprism provides advantages over a rotating grating disc, the system disclosed in U.S. Pat. No. 4,606,601 is not practical for large format scanners. In the disclosed system, the output beam of the pentaprism 10 scans across the lens 20 in order to focus the beams on the external surface of a scanning drum 22. The lens 20 must provide several functions including focusing, field flattening and the elimination of distortions due to the fact that the beam is scanned across the lens. The f-theta lens required to perform such functions would be extremely large, bulky and expensive to manufacture. For example, a f-theta lens for a 20 inch scan line with 2400 dpi resolution would weigh on the order of ninety-five pounds.

Figure 3:
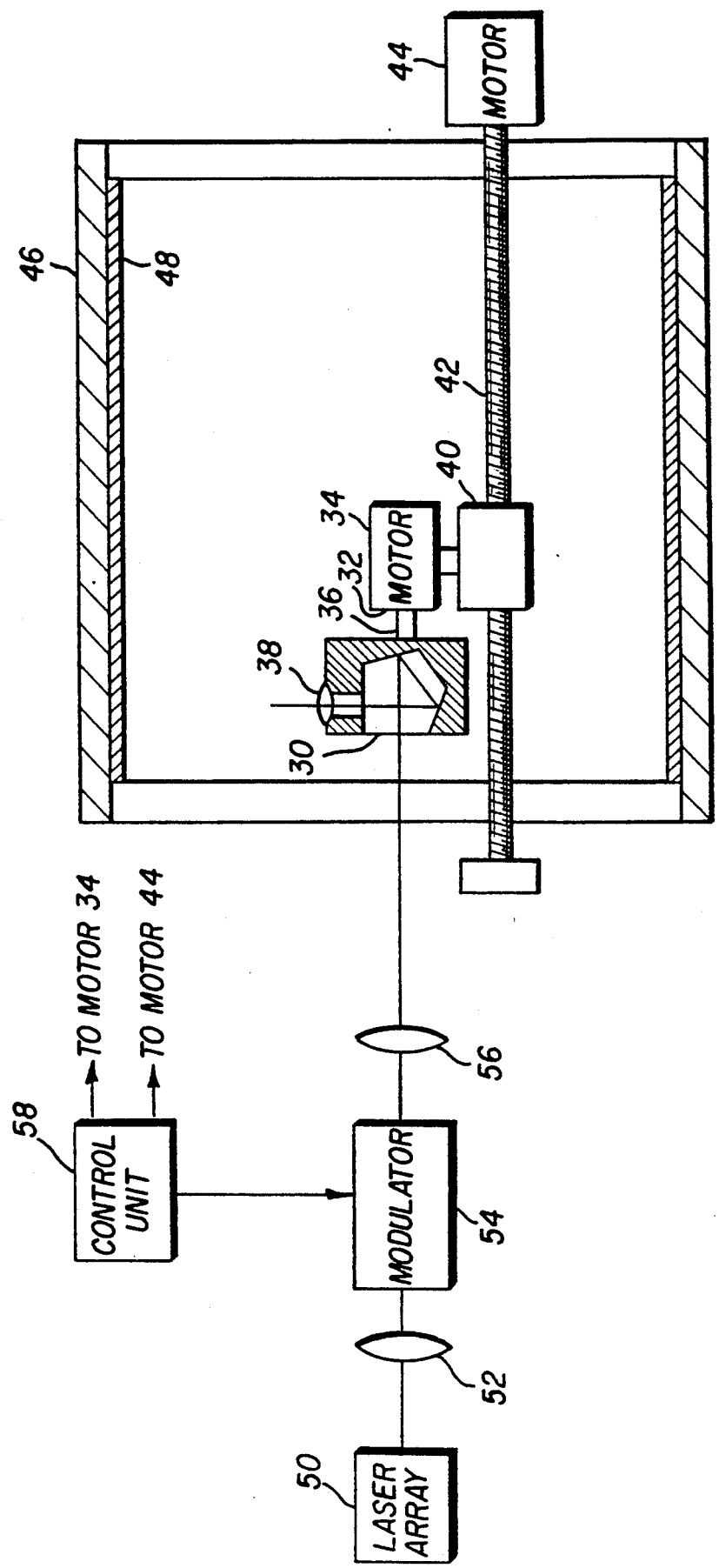
FIG. 3 illustrates a scanning system in accordance with the present invention that incorporates a pentaprism and lens mounted on a frame assembly that is located within a scanning drum.

Referring now to FIG. 3, a large format scanner in accordance with the present invention is shown including a pentaprism 30 that is mounted to a frame assembly 32. The frame assembly 32 is coupled to a drive motor 34 via a shaft 36. A spherical lens 38 is also retained by the frame assembly 32. The lens 38 provides on axis focusing of light beams emanating from the pentaprism 30. The drive motor 34, preferably a brushless D.C. motor, is attached to a movable frame assembly 40 which is driven by a lead screw 42 to provide a scanning movement. The lead screw 42 is driven by motor 44. The pentaprism 30 is located within a scanning drum 46. A photosensitive material 48, such as photographic paper, lines the scanning drum 46 and is exposed to the output light beams emitted from the pentaprism 30 during operation of the scanner. A laser array 50 is provided to generate multiple light beams that are focused through a lens 52 to a modulator 54. The modulator 54 modulates the multiple beams generated by the laser array 50 under the control of a central control unit 58 in response to an input data signal. The modulated beams pass through a collimator 56 before entering the pentaprism 30. The overall operation of scanner, including motors 34 and 44 in addition to the modulator 54, is controlled by the central control unit 58.

In operation, the control unit 58 activates the drive motor 34 causing the frame assembly 32, and therefore the pentaprism 30 and the lens 38, to rotate within the scanning drum 46. The multiple light beams generated by a laser array 50 and modulated by the modulator 54 are provided to the pentaprism 30. The multiple light beams exit the pentaprism 30, pass through the lens 38 and are focused onto the photosensitive material 48 placed within the scanning drum 46. As the pentaprism 30 rotates, the motor 44 is activated by the central control unit 58 to rotate the lead screw 42, thereby causing the entire drive motor 34 and frame assembly 32 to move laterally along the length of the scanning drum 46.

The placement of the lens 38 on the rotating frame assembly 32 within the scanning drum provides significant advantages. The spherical lens 38 can be of a simple design that is easily and inexpensively manufactured when compared to the lens that would be required in the system disclosed in U.S. Pat. No. 4,606,601. While the system is not sensitive to wobble of the pentaprism, wobble induced error due to the rotation of the lens 38 must be considered. Lens wobble is minimized, however, by keeping the focal length of the lens short. Alternatively, the lens 38 can be designed so that its nodal point is on the axis of rotation. Lens wobble will not be a factor if the lens wobbles around its nodal point.

The large format scanner illustrated in FIG. 3 is capable of printing a large image in a relatively short period of time, namely, 1/10 or less than the time required by conventional scanners such as the Hell DC 300. This is due in part to the fact that the scanning rate is greatly increased by rotating the pentaprism 30, i.e., the scanning mechanism, within the scanning drum 46 instead of attempting to focus the output beams from the pentaprism 30 onto the external surface of a rotating scanning drum as illustrated in U.S. Pat. No. 4,606,601. It becomes extremely difficult to rotate large format drums at speeds in excess of about 1200 rpm due to the mass of the drum. In contrast, the frame assembly 32 can be rotated by the motor 34 at speeds of 10,000 rpm or greater. Thus, the overall scanning speed, or throughput, is greatly enhanced by the combination of the multiple write beams and increased rotating speed of the scanning mechanism over external drum scanning systems.

Figure 4:
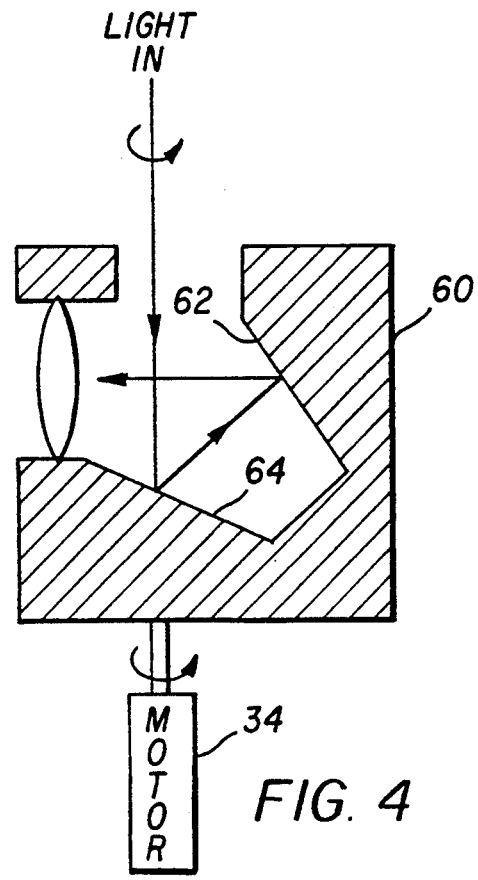
FIG. 4 illustrates a second embodiment of the invention wherein the pentaprism illustrated in FIG. 3 is replaced with a pentamirror.

The invention has been described with reference to certain preferred embodiments thereof. It will be understood, however, that modifications and variations can be made within the spirit and scope of the appended claims. For example, while the preferred embodiment specifically illustrates the use of a pentaprism contained within a frame assembly, a separate pentaprism need not be provided as the frame assembly can be formed as a pentamirror structure, i.e. a block 60 having mirrored surfaces 62 and 64, as illustrated in FIG. 4. Other equivalent structures including, but not limited to, a right angle prism or right angle monogon can be employed in place of the pentaprism. In each case, however, the lens 38 is attached to and rotates with the frame assembly, eliminating the need for a large expensive lens. All such equivalent structures are referred to as wobble free and wavelength insensitive scanning assemblies for the purposes of this application. The type of light source and modulator can also be varied to provide the multiple write beams. For example, a single input laser beam can be provided to an integrated optics modulator which splits the input laser beams into several independently modulated write beams.

What is claimed is:

1. A laser scanner comprising: a scanning drum; light source means for generating multiple independently modulated light beams; a wobble free and wavelength insensitive scanning assembly located within said scanning drum; means for supplying said multiple light beams generated by said light source means to said scanning assembly; rotation means, coupled to said scanning assembly, for rotating said scanning assembly within said scanning drum about an axis; and drive means for moving said scanning assembly along said axis as said scanning assembly is rotated by said rotation means.

2. A laser scanner as claimed in claim 1, wherein said scanning assembly comprises a pentaprism and a lens mounted on a frame assembly.

3. A laser scanner as claimed in claim 1, wherein said rotation means comprises a motor coupled to said scanning assembly by a drive shaft.

4. A laser scanner as claimed in claim 3, further comprising a motor frame assembly for holding said motor and wherein said drive means includes a lead screw coupled to said motor frame assembly and a drive motor coupled to said lead screw.

5. A laser scanner as claimed in 1, wherein said scanning assembly comprises a pentamirror and a lens mounted on a frame assembly.

6. A laser scanner comprising: a scanning drum; light source means for generating multiple independently modulated light beams; a wobble free and wavelength insensitive scanning assembly located within said scanning drum, said scanning assembly including a spherical lens and at least one of a pentaprism and pentamirror mounted to a frame assembly; a motor mounted on a motor mount assembly; means for supplying said multiple light beams generated by said light source means to said scanning assembly; and drive means for moving said motor mount assembly along a lateral dimension of said scanning drum;

wherein said motor rotates said frame assembly about an axis parallel to the lateral dimension of said scanning drum and said spherical lens focuses the multiple light beams supplied to said scanning assembly on an interior surface of said scanning drum.

* * * * *

UNITED STATES PATENT AND TRADEMARK OFFICE
CERTIFICATE OF CORRECTION

PATENT NO. : 5,026,133

DATED : June 25, 1991

INVENTOR(S) : James E. Roddy et al.

It is certified that error appears in the above-identified patent and that said Letters Patent is hereby corrected as shown below:

Title page:

Section [73] Assignee: change "Torii Winding Machine Co., Ltd." to

--EASTMAN KODAK COMPANY--

Signed and Sealed this

Twelfth Day of January, 1993

*Attest:*

DOUGLAS B. COMER

*Attesting Officer*      *Acting Commissioner of Patents and Trademarks*